United States Patent
Shinozaki et al.

(10) Patent No.: US 8,853,568 B2
(45) Date of Patent: Oct. 7, 2014

(54) PLATFORM SCALE AND LOAD DETECTION UNIT

(75) Inventors: Naoya Shinozaki, Tokyo (JP);
Shinichiro Ishida, Tokyo (JP);
Kazufumi Naito, Tokyo (JP)

(73) Assignee: Shinko Denshi Co., Ltd., Tokyo (JP)

( * ) Notice: Subject to any disclaimer, the term of this patent is extended or adjusted under 35 U.S.C. 154(b) by 274 days.

(21) Appl. No.: 13/376,332

(22) PCT Filed: Jun. 23, 2010

(86) PCT No.: PCT/JP2010/060667
§ 371 (c)(1),
(2), (4) Date: Dec. 9, 2011

(87) PCT Pub. No.: WO2011/001875
PCT Pub. Date: Jan. 6, 2011

(65) Prior Publication Data
US 2012/0080241 A1     Apr. 5, 2012

(30) Foreign Application Priority Data

Jun. 30, 2009   (JP) .................................. 2009-155212

(51) Int. Cl.
*G01G 21/28* (2006.01)
*G01G 3/13* (2006.01)
*G01G 3/16* (2006.01)

(52) U.S. Cl.
CPC . *G01G 21/28* (2013.01); *G01G 3/16* (2013.01)
USPC ..................................... 177/239; 177/210 FP

(58) Field of Classification Search
USPC ................... 177/126, 180, 238–244, 210 FP; 73/862.59
See application file for complete search history.

(56) References Cited

U.S. PATENT DOCUMENTS 4,281,728 A * 8/1981 Dickason et al. ............. 177/134
4,623,813 A * 11/1986 Naito et al. ............... 310/313 R
(Continued)

FOREIGN PATENT DOCUMENTS

JP   61-115935 U   7/1986
JP   63-045520 A   2/1988
(Continued)

OTHER PUBLICATIONS

International Search Report of PCT/JP2010/060667, mailing date Jul. 20, 2010.

*Primary Examiner* — Randy W Gibson
*Assistant Examiner* — Natalie Huls
(74) *Attorney, Agent, or Firm* — Westerman, Hattori, Daniels & Adrian, LLP

(57) ABSTRACT

(Problem)
To provide a high precision platform scale
(Means to Solve the Problem)
A platform scale for weighing an object to be weighed by supporting it by a plurality of load detection sections, wherein the load detection section comprises a load sensor 40 having a block body 42 for transmitting an applied load to a tuning fork vibrator 41 coupled to the block body 42 by reducing the load, a circuit board having fabricated thereon circuitry for converting a signal from the tuning fork vibrator into a digital signal and a sensor case 33 for accommodating the load sensor and the circuit board. The sensor case 33 is made by casting stainless material by a lost wax process and is directly coupled to parallel base frames 20 for maintaining the distance between the base frames. The sensor case has sufficient mechanical strength and also acts as a structural member for the base frames, thereby reducing the number of components and the height of a weighing table.

5 Claims, 17 Drawing Sheets

(56) References Cited

U.S. PATENT DOCUMENTS

| | | | |
|---|---|---|---|
| 4,884,645 A * | 12/1989 | Knothe et al. | 177/180 |
| 4,947,694 A * | 8/1990 | Kirman et al. | 73/862.59 |
| 5,313,023 A * | 5/1994 | Johnson | 177/229 |
| 5,478,975 A * | 12/1995 | Ford | 177/210 FP |
| 5,894,112 A * | 4/1999 | Kroll | 177/134 |
| 5,895,894 A * | 4/1999 | Zumbach | 177/180 |
| 7,498,728 B2 * | 3/2009 | Albert | 310/370 |
| 7,554,043 B2 * | 6/2009 | Whitney | 177/238 |
| 8,017,877 B1 * | 9/2011 | Cohen | 177/126 |
| 2005/0115745 A1 * | 6/2005 | Kroll et al. | 177/126 |

FOREIGN PATENT DOCUMENTS

| | | |
|---|---|---|
| JP | 5-346338 A | 12/1993 |
| JP | 2010-066016 A | 3/2010 |

* cited by examiner

PLATFORM SCALE AND LOAD DETECTION UNIT

FIELD OF INVENTION

The present invention relates to a platform scale and a load detection unit that is used in such platform scale for load detection, and specifically is directed to realize high precision weighing.

BACKGROUND ART

Electronic scales can be classified primarily into a load cell type using a strain gauge, a tuning fork vibration type using a tuning fork and an electromagnetic balancing type using an electromagnet and an electromagnetic coil.

The load cell type makes weight measurements based on the amount of transformation of the strain gauge by a load to be weighed. As disclosed in a Patent Document 1 hereunder, the tuning fork vibration type makes weight measurements by using the fact that vibration frequency of a tuning fork varies in proportion to a load that is applied between both ends of the tuning fork. On the other hand, the electromagnetic balancing type breaks the balanced condition of a mechanical balance mechanism by a load and recovers the balanced condition by flowing electrical current through the electromagnetic coil, thereby determining the weight of a load based on the amplitude of the electrical current.

As far as precision of these scales is concerned, the tuning fork vibration type and the electromagnetic balance type are higher than the load cell type. On the other hand, in the manufacturing cost of these scales, the electromagnetic balancing type is the highest because of its complex construction and the load cell type is the lowest because of its simplest construction.

Currently, most of platform scales having a weighing range (measurement range) up to 300 kg are the load cell type.

PRIOR ART

Patent Document
Patent Document 1: JP2002-131148 A

SUMMARY OF INVENTION

Problems to be Solved by the Invention

However, there are increasing needs in production fields for measuring weight of objects to be weighed in high precision for cases such as, for example, weighing raw bath in a drum. This is the reason why it is necessary to improve measurement precision of platform scales.

Precision improvement of a platform scale cannot be achieved by simply employing higher precision weighing type. It is necessary to take various countermeasures to temperature changes, moisture, dust and the like that may degrade measurement precision. It is also necessary to assure mechanical strength in order to tolerate heavy objects to be measured.

Additionally, it is necessary to lower the table height of such platform scale for ease of loading and unloading operations of objects to be measured.

The present invention was made in consideration of the foregoing circumstances. It is an object of the present invention to provide a high precision platform scale and also a load detection unit for enabling to implement such platform scale.

Means to Solve Problem

The present invention relates to a platform scale for weighing an object to be weighed using one or a plurality of load detection sections that support the object. It is characterized in that each load detection section comprises a load sensor having a tuning fork vibrator coupled to a block body that transmits an applied load to the tuning fork vibrator in a reduced manner; a base board on which a circuit for converting a signal from the tuning fork vibrator into a digital signal is mounted; and a sensor case for accommodating the load sensor and the base board and that the sensor case is made of stainless material casting by a lost wax process and is directly coupled to parallel base frames for maintaining the distance between the base frames.

The stainless sensor case made by a lost wax casting process has sufficient mechanical strength and also acts as a structure for the base frame. As a result, it reduces the number of components and also the height of a weighing table. Additionally, the block body of the load sensor having sufficient mechanical strength helps stable reduction operation even if a heavy load may be applied.

In another platform scale of the present invention, the sensor case comprises a load sensor chamber for accommodating the load sensor, a base board chamber for accommodating the base board and an isolation wall for preventing airflow between the load sensor chamber and the base board chamber. Ventilation of the load sensor chamber is performed only through an air hole or vent in the bottom of the load sensor chamber.

The isolation wall prevents the load sensor from degrading precision due to heat generated from the base board. The air hole prevents measurement precision degradation due to air pressure changes in the load sensor chamber when measurement is made.

In another platform scale of the present invention, the air hole is covered with a filter made of a lamination of a porous film and a non-woven sheet at the outside of the sensor case. The outer surface of the filter is held down with a plate that is removable when replacing the filter. As a result, external air passing through the filter at the periphery of such hold-down plate is introduced into the load sensor chamber, while the air in the load sensor chamber is exhausted through the reverse path.

The porous film prevents water from entering, while the non-woven sheet prevents the porous film from staining and/ or being broken by external pressure. On the other hand, the hold-down plate protects the filter from accidents to be broken by any sharp object.

In still another platform scale of the present invention, it takes a construction that the block body of the load sensor is fixed to the bottom of the load sensor chamber by inserting bolts into through-holes in a fixed side of the block body and that bolts coupled to a movable side of the block body transform by receiving the weight. This particular construction enables to replace the load sensor with a load cell that is identical in mounting the fixed side of the load sensor chamber and coupling of the bolts to the movable side.

The load sensor using a tuning fork vibrator assures high precision in case of no external vibration but degrades precision in an environment having considerable external vibration. On the other hand, although a load cell exhibits low precision, there is no change in precision under vibrating environment. The platform scale according to the present invention is capable of switching a load sensor using a tuning fork vibrator and a load cell depending on environment where the scale is used.

Another aspect of the present invention is a load detection unit to be used with a platform scale for weighing an object to be weighed. It comprises a load sensor having a tuning fork vibrator coupled to a block body for transmitting an applied load to the tuning fork vibrator in a reduced manner; a base board on which a circuit for converting a signal from the tuning fork vibrator into a digital signal is fabricated; and a sensor case for accommodating the load sensor and the base board, wherein the sensor case is made of stainless material casting by a lost wax process and comprises a load sensor chamber for accommodating the load sensor, a base board chamber for accommodating the base board and an isolation wall for preventing air flow between the load sensor chamber and the base board chamber, thereby enabling ventilation of the load sensor chamber only through an air hole in the bottom of the load sensor chamber.

A user who has a plurality of such load detection units is able to implement a platform scale by positioning a weighing table on such load detection units.

Additionally, in the load detection unit according to the present invention, the air hole is covered at the outside of the sensor case with a filter that is a lamination of a porous film and a non-woven sheet. The outer surface of the filter is held down with a plate that is removable when replacing the filter. As a result, external air reaching the filter at the periphery of the plate is permitted to enter the load sensor chamber through the air hole and air inside the load sensor chamber is exhausted through the reverse route.

Advantages of the Invention

The present invention realizes a high precision platform scale. The platform scale can be implemented with a small number of components, thereby enabling to reduce manufacturing processes and thus manufacturing cost. Additionally, the height of the weighing table on which an object to be weighed is placed can be lowered, thereby making the platform scale easy to use.

On the other hand, the load detection unit according to the present invention can be placed in a market as an independent unit. A user can buy such load detection units and arrange a plurality of such units in parallel for placing a weighing table in order to implement any desirable platform scale.

EMBODIMENTS TO IMPLEMENT THE INVENTION

Figure 1:
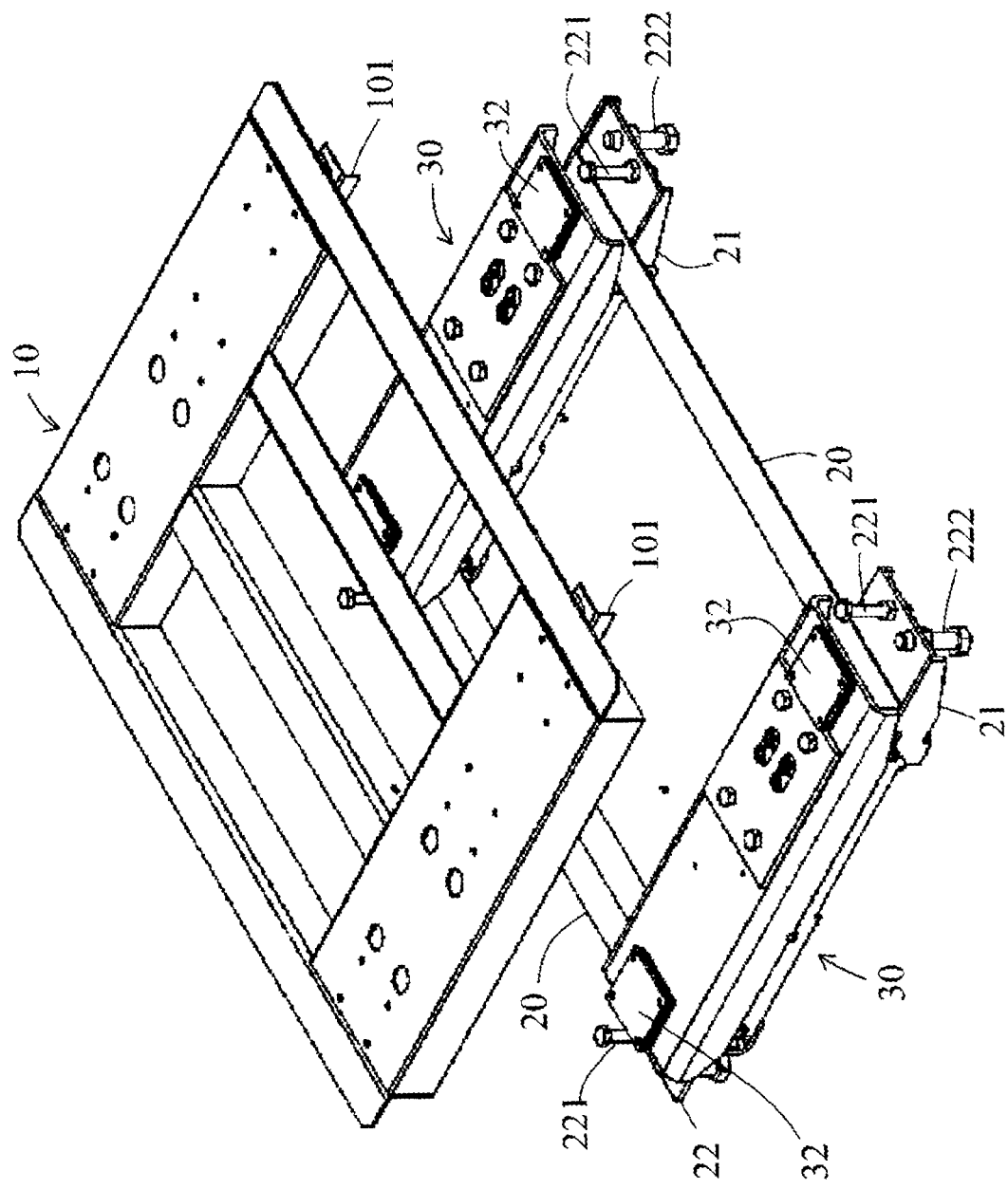
FIG. 1 is an exploded perspective view of the platform scale according to an embodiment of the present invention.
Figure 2:
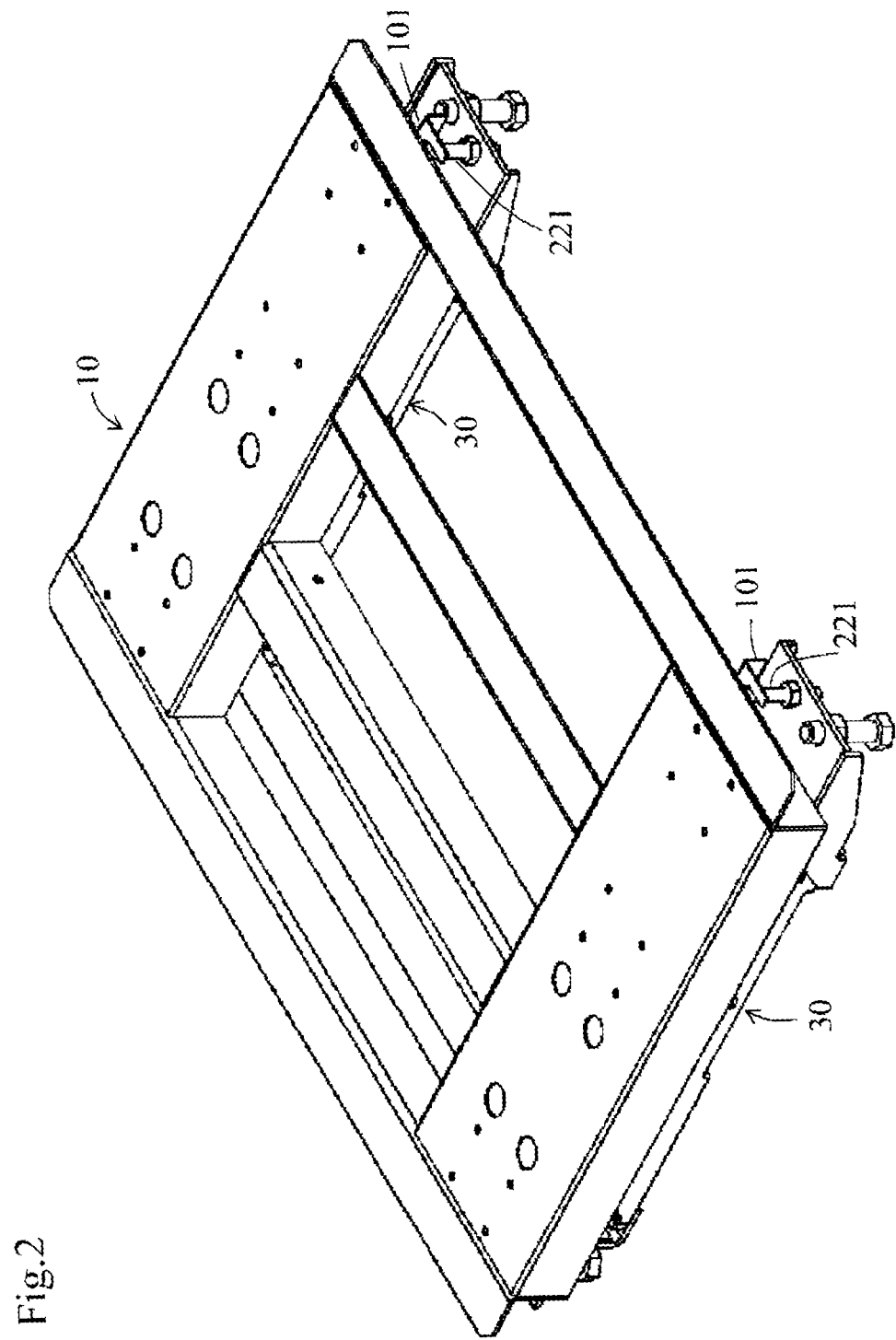
FIG. 2 is a perspective view of the platform scale according to an embodiment of the present invention.
Figure 3:
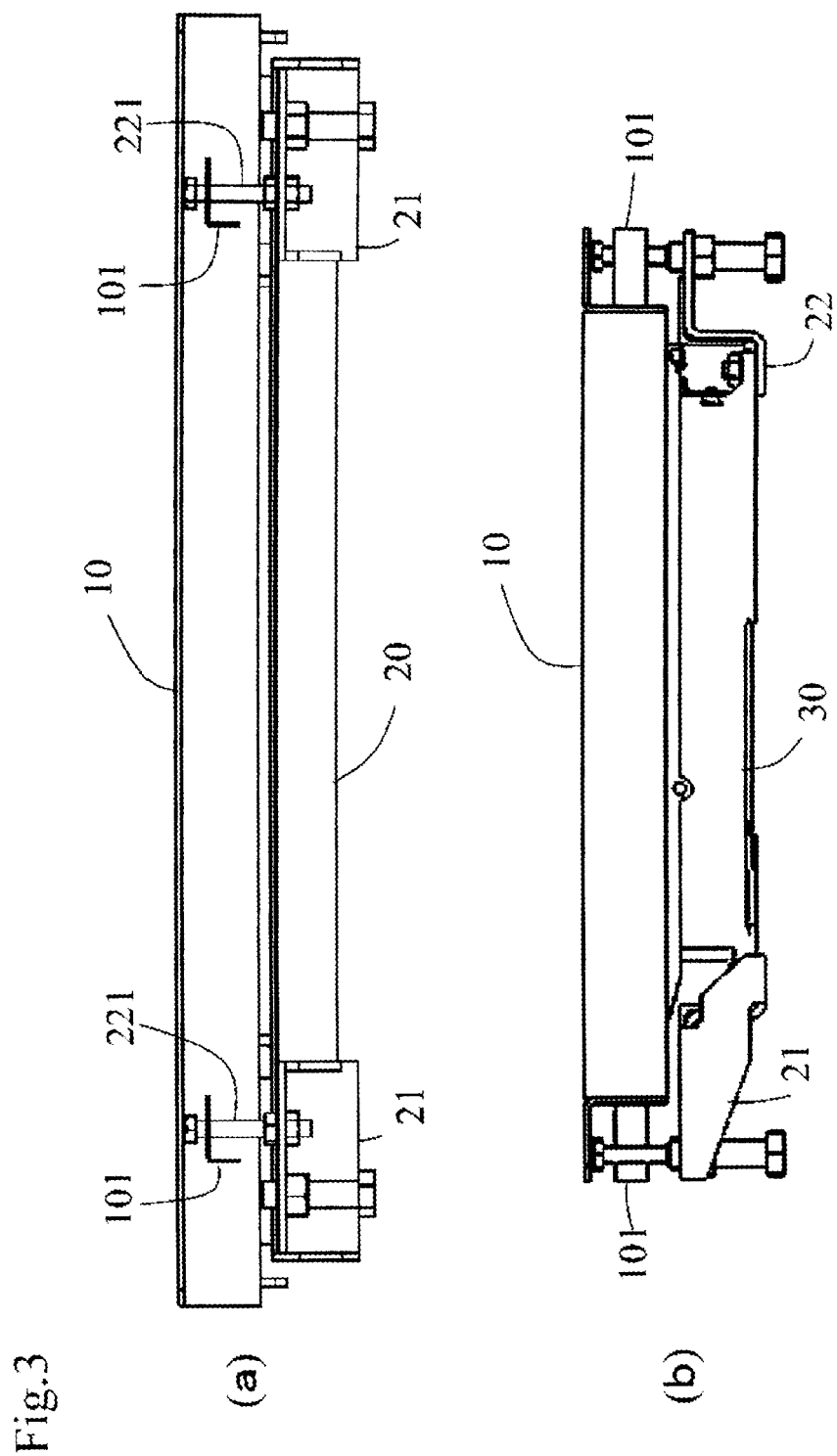
FIG. 3 is a side view of the platform scale according to an embodiment of the present invention.

As shown in FIG. 1 in an exploded perspective view, a platform scale according to an embodiment of the present invention comprises an upper frame 10 for supporting a weighing table (not shown), a pair of parallel base frames 20, 20 and load detection units 30 bridging between the base frames 20, 20. FIG. 2 illustrates the condition in which these components are assembled. FIG. 3 (*a*) is a side view of the longer side of the platform scale as shown in FIG. 2, while FIG. 3 (*b*) is a side view of the shorter side.

Figure 4:
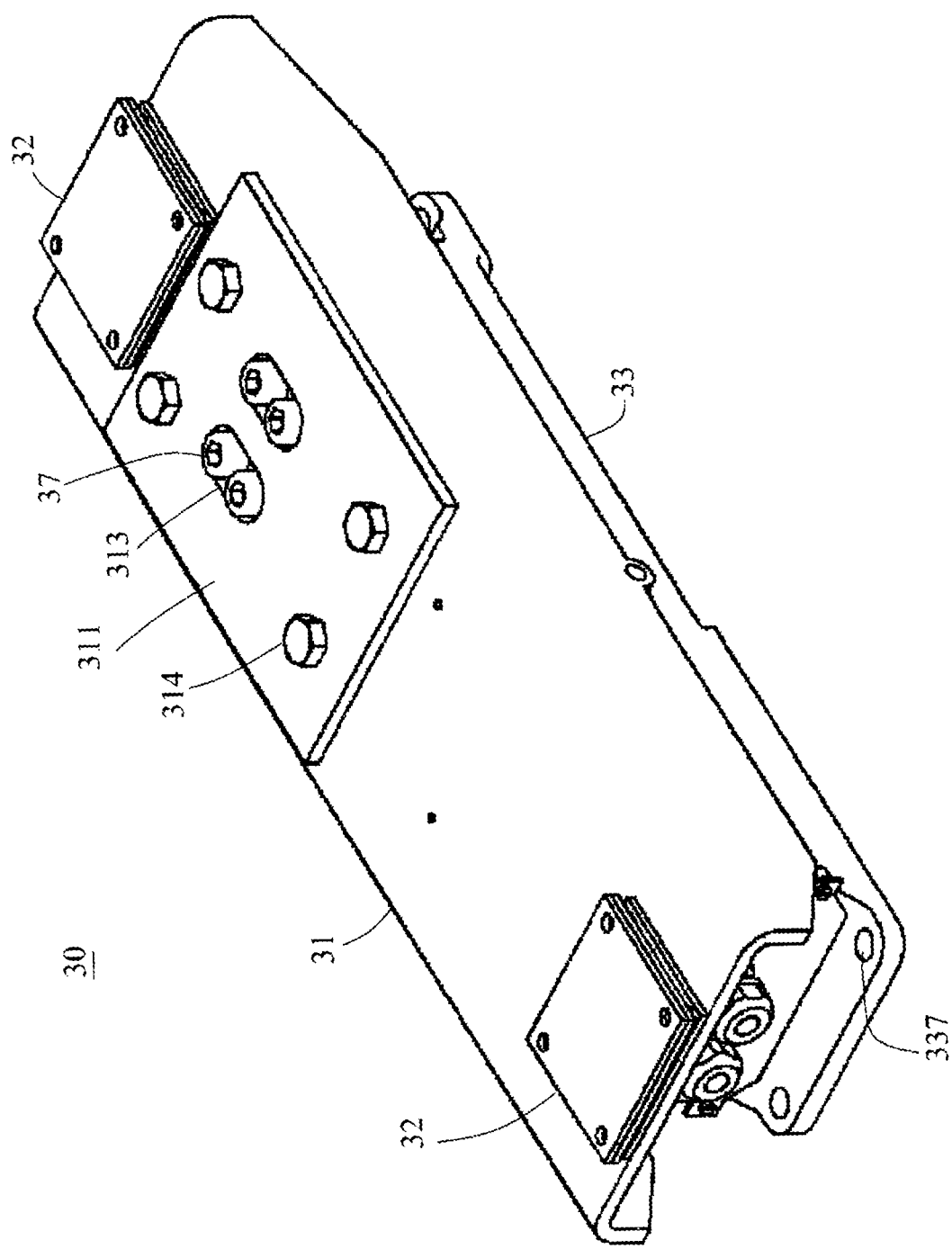
FIG. 4 is a perspective view of the load detection unit according to an embodiment of the present invention.
Figure 5:
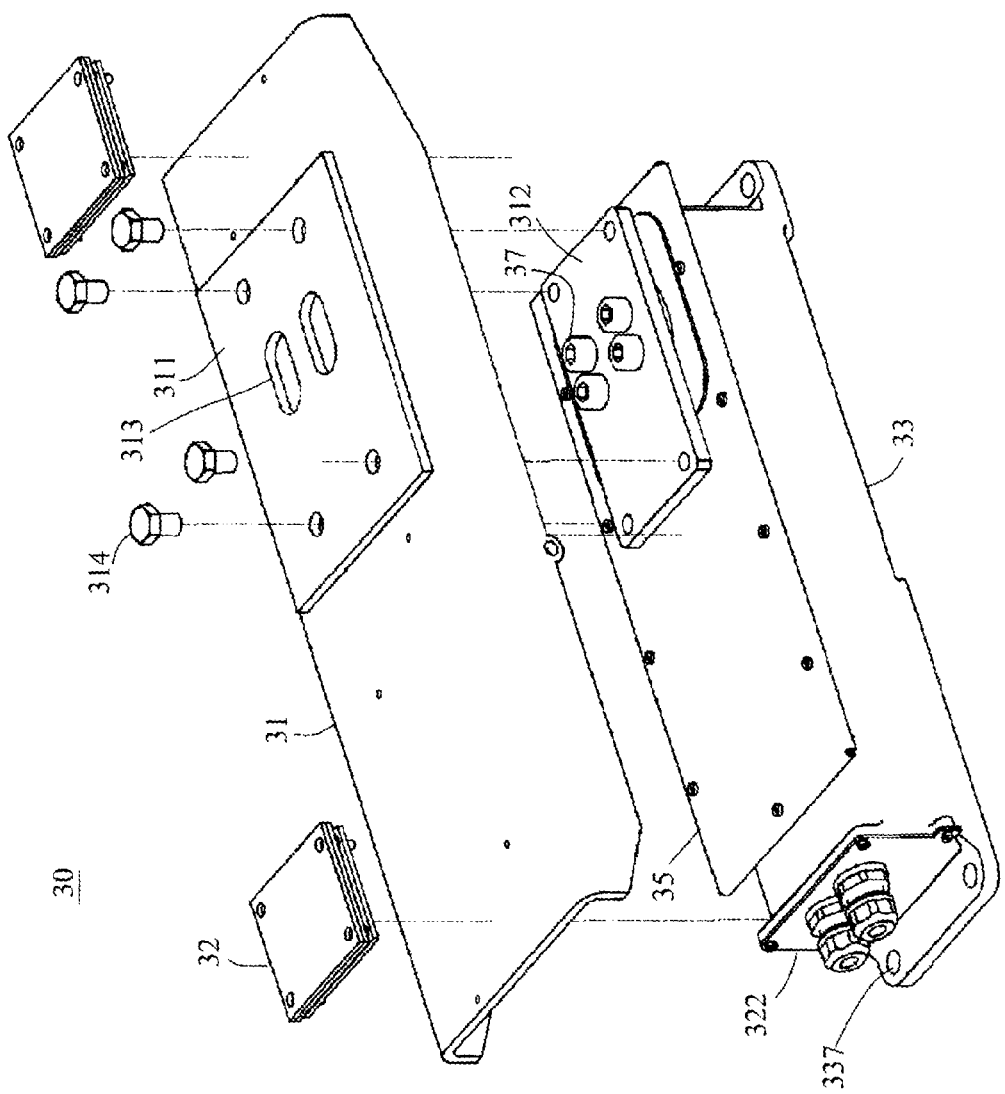
FIG. 5 is an exploded perspective view of the load detection unit according to an embodiment of the present invention.

FIG. 4 shows the load detection unit 30 per se, while FIG. 5 is an exploded perspective view thereof. The load detection unit 30 comprises an upper support member 31 for supporting the upper frame 10, a load sensor that will be described hereinafter and a sensor case 33 for accommodating a circuit board.

Figure 6:
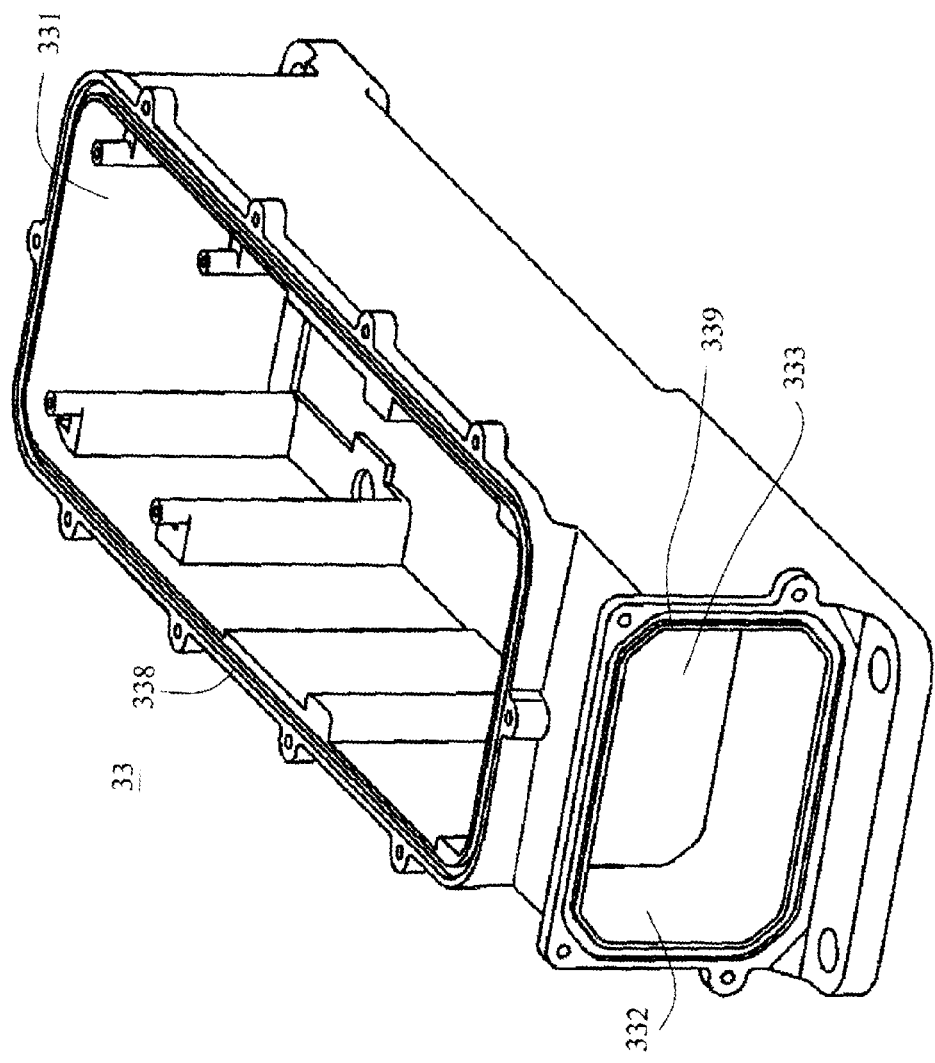
FIG. 6 is a perspective view of a sensor case for an embodiment of the present invention.
Figure 7:
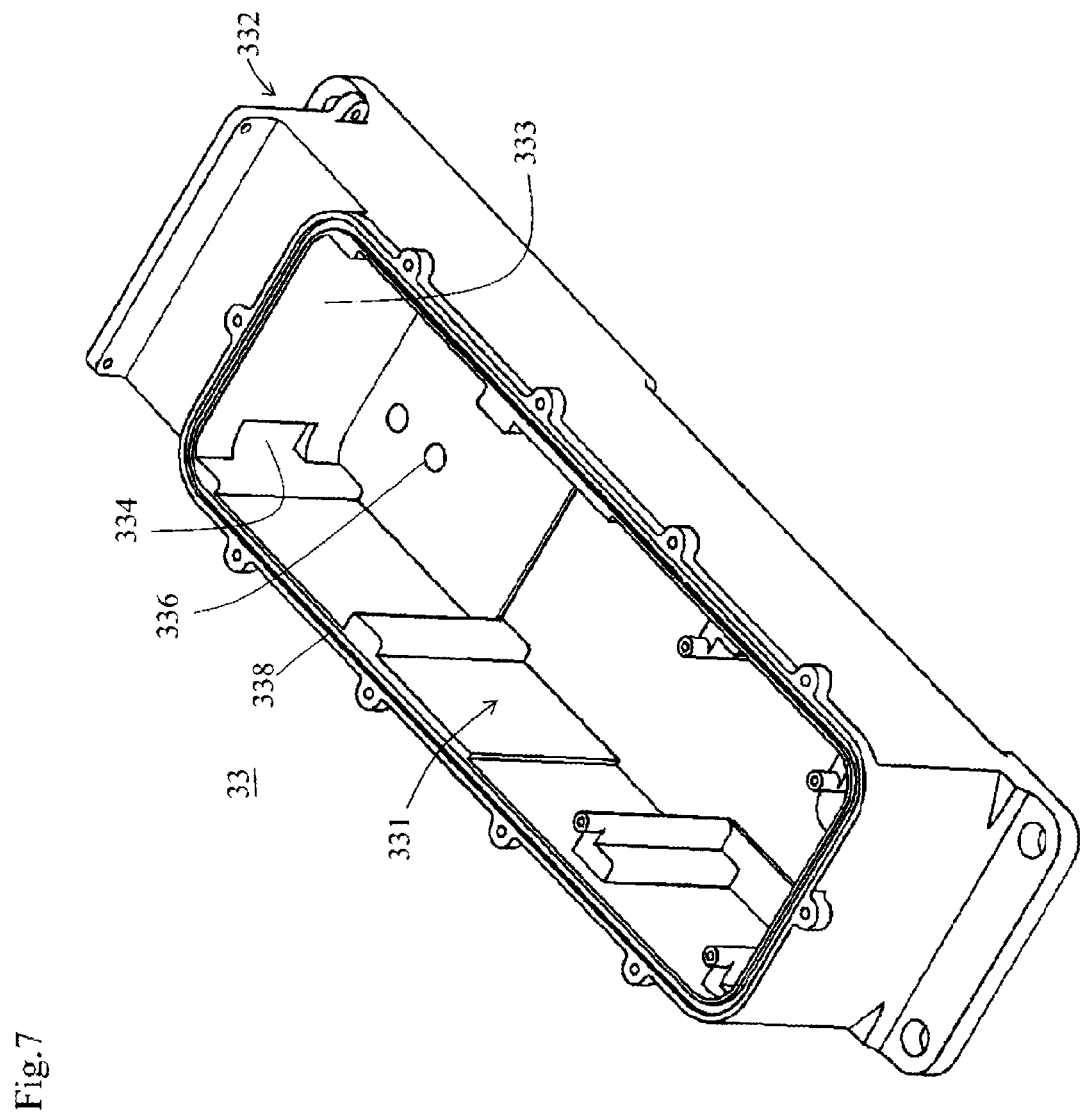
FIG. 7 is a perspective view of the sensor case for the embodiment of the present invention seen from a different direction.
Figure 8:
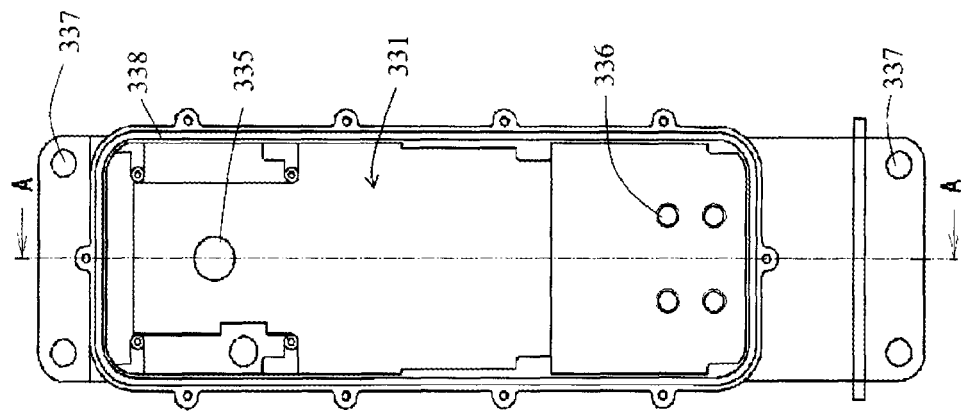
FIG. 8 is a plan view of the sensor case for the embodiment of the present invention.

The sensor case 33 is made by a casting process in which a die is first formed by a lost wax process and then allowing molten stainless material to flow into the die. The sensor case 33 is formed in a generally rectangular box as shown in FIG. 6. FIG. 7 is a perspective view of the sensor case 33 seen from a different direction and FIG. 8 is a plan view of the sensor case 33.

The sensor case 33 comprises a load sensor chamber 331 for accommodating the load sensor, a circuit board chamber 332 for accommodating the circuit board and an isolation wall 333 for isolating the load sensor chamber 331 and the circuit board chamber 332. The load sensor chamber 331 is open at the upper portion. A groove 338 is formed at the open end for inserting a grommet therein. As shown in FIG. 6, the circuit board chamber 332 is open at an longitudinal end of the box-shaped sensor case and a groove 339 is formed at the open end for inserting a packing therein.

The isolation wall 333 between the load sensor chamber 331 and the circuit board chamber 332 is formed with an air space 334 for passing electrical wires that interconnect between circuitry on the base board and the load sensor as shown in FIG. 7. If better heat isolation is needed, the air space 334 is closed after passing the electrical wires, thereby preventing air in the circuit board chamber 332 heated by heat generated from the circuit board from entering the load sensor chamber 331 through such air space 334.

It is to be noted here that the heat conductivity of the stainless material that constitutes the isolation wall 333 is sufficiently low as compared to that of aluminum or the like. This ensures that only small amount of heat is conducted to the load sensor chamber 331 from the circuit board chamber 332 through the isolation wall 333.

The opening of the load sensor chamber 331 is closed with a cover 35 (see FIGS. 5 and 9) after accommodating the load sensor in the load sensor chamber 331. On the other hand, after accommodating the circuit board in the circuit board chamber 332, the opening of the circuit board chamber 332 is covered with a terminal plate 322 through which terminals are exposed.

Figure 10:
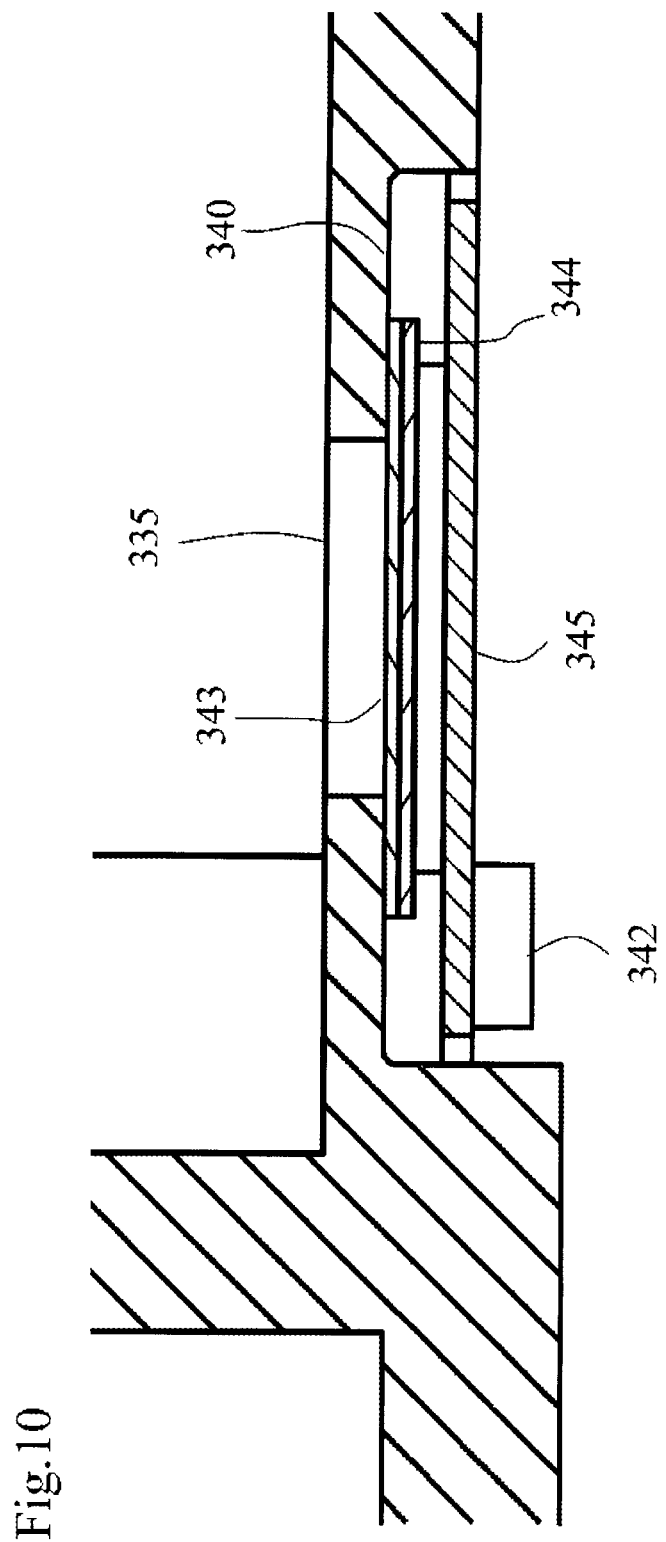
FIG. 10 is a cross section view of an air hole in the sensor case for the embodiment of the present invention.
Figure 11:
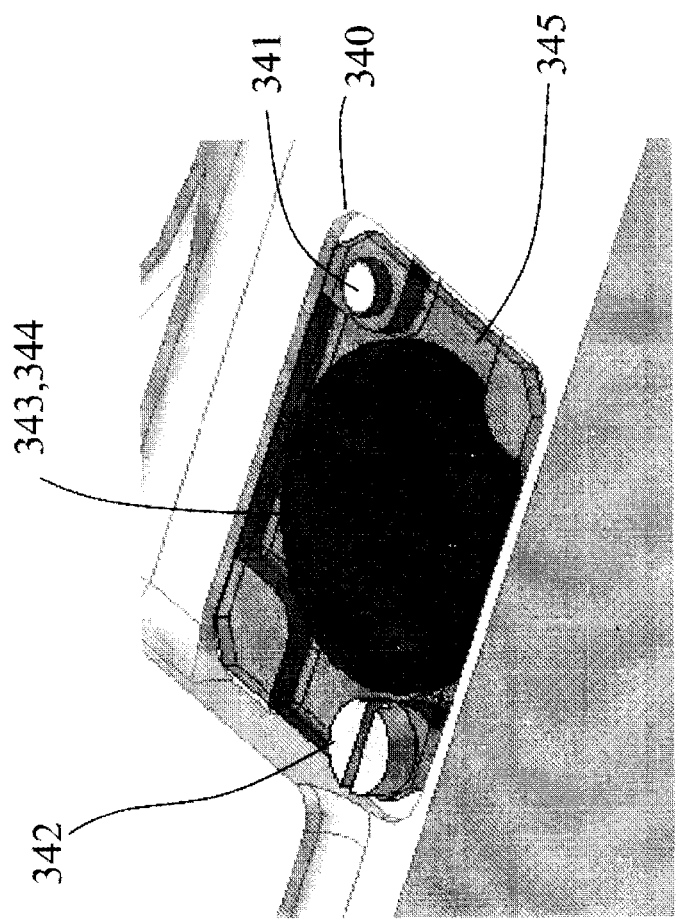
FIG. 11 is a perspective view of the air hole in the sensor case for the embodiment of the present invention.
Figure 12:
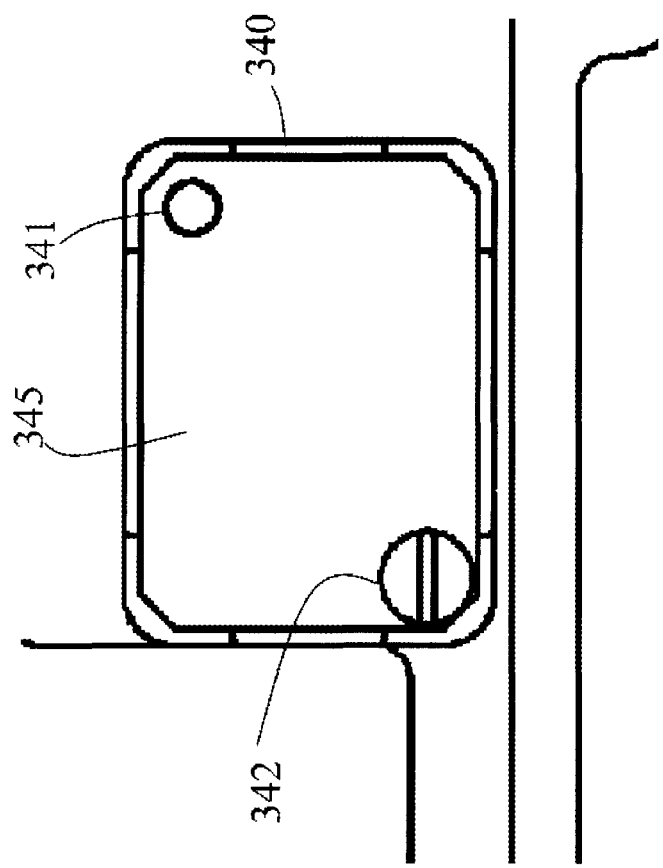
FIG. 12 is a plan view of the air hole in the sensor case for the embodiment of the present invention.

Also, the load sensor chamber 331 is formed with an air hole 335 in the bottom as shown in FIG. 8. The sensor case 33 is formed with a recessed portion 340 at the outer side where the air hole 335 locates for placing a filter made of a lamination of a porous film 343 and a non-woven sheet 344 in such a manner to close the air hole 335 as shown in FIGS. 10 and 11. A generally rectangular metal plate 345 having an outer shape similar to that of the recessed portion 340 but a smaller area than the recessed portion 340 is also placed with a certain distance from the outer surface of the filter. As shown in FIGS. 11 and 12, the metal plate 345 is formed with a pair of holes at diagonal positions for engagement with a positioning pin 341 in one hole and insertion of a screw 342 into the other hole in screw mating with the sensor case 33, thereby fastening the metal plate 345 onto the sensor case 33.

The filter can be replaced by unscrewing the screw 342 for removing the metal plate 345.

The porous film 343 constituting the filter is made from fluorine plastics or the like for preventing water penetration. The non-woven sheet 343 keeps dust away from the porous film 343 and protects it from damaging due to external pressure. On the other hand, the metal plate 345 protects the filter from being broken by any sharp object.

The opening of the load sensor chamber 331 is closed with the cover 35 and the air hole 335 is also covered with the metal plate 345. Since there is an air gap between the metal plate 345 and the recessed portion 340, external air is permitted to enter the load sensor chamber 331 passing through the air hole 335 and the filter from the periphery of the metal plate 345. While passing through the filter, any moisture and duct contained in the external air are removed by the filter. The air inside the load sensor chamber 331 is also exhausted through the reverse route.

The air hole 335 prevents the load sensor chamber 331 from over pressure or negative pressure by the action of a diaphragm 51 (see FIG. 9) that will be described hereinafter when a measurement is made.

Figure 9:
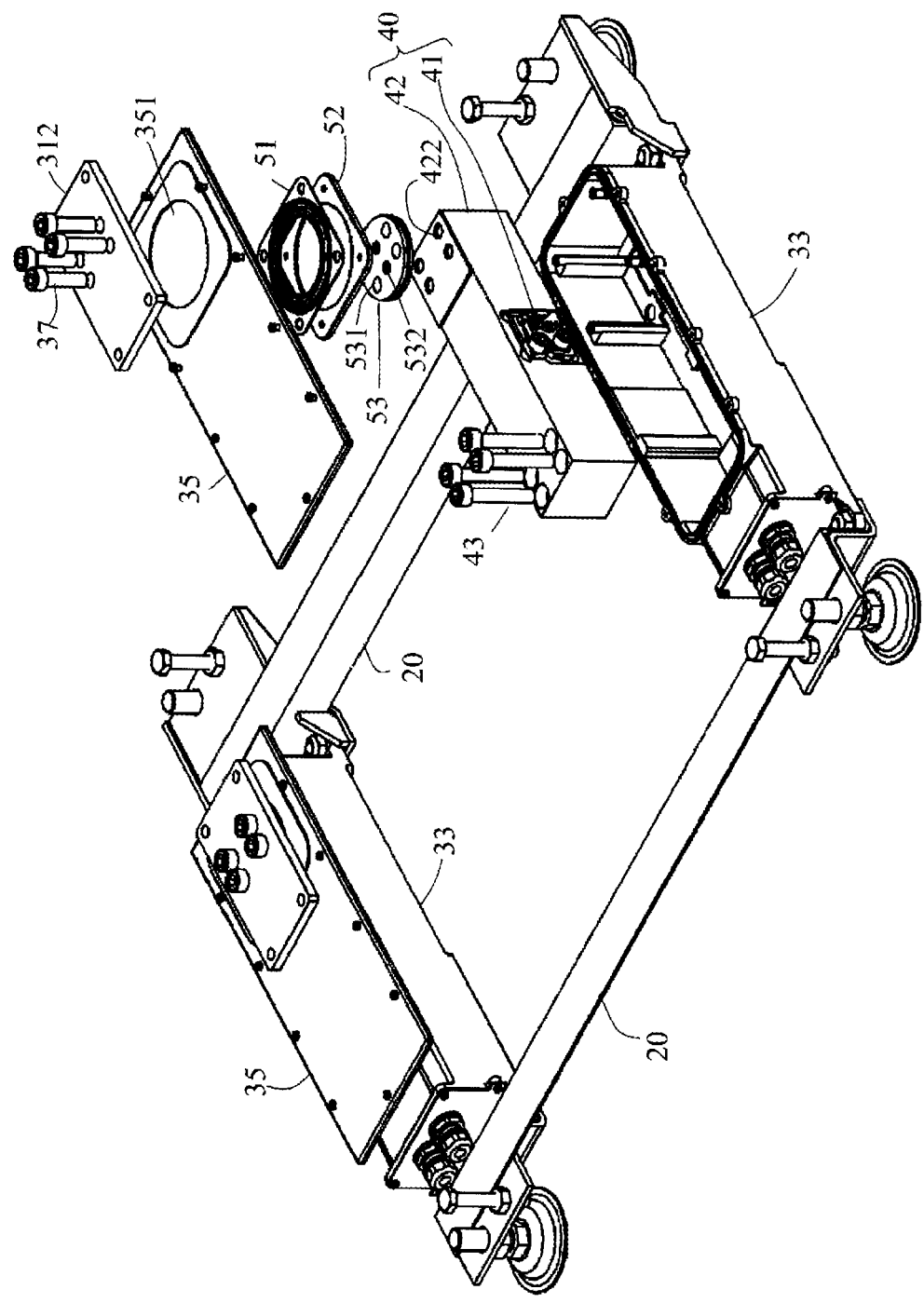
FIG. 9 is an exploded perspective view of one part of the platform scale according to an embodiment of the present invention.
Figure 13:
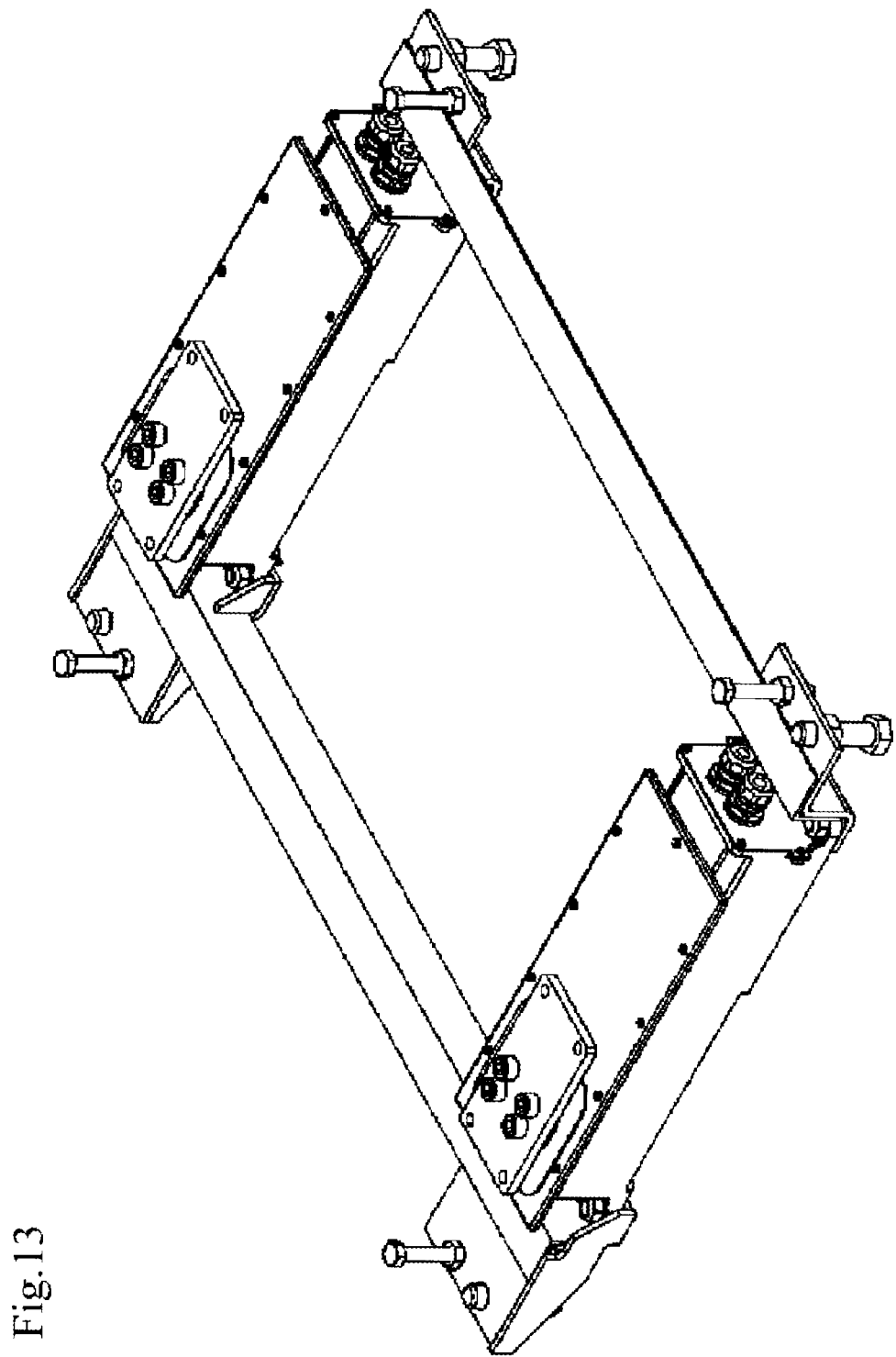
FIG. 13 is a perspective view to show a partial construction of the platform scale according to an embodiment of the present invention.

Additionally, as shown in FIG. 8, the sensor case 33 is formed with screw holes 337 for mounting it on the base frames 20. Since the sensor case 33 has sufficient rigidity, it can be used as a structural member for maintaining the distance between the base frames 20, 20. FIGS. 9 and 13 show the sensor cases 33 mounted on the base frames 20 by means of the screw holes 337.

Figure 14:
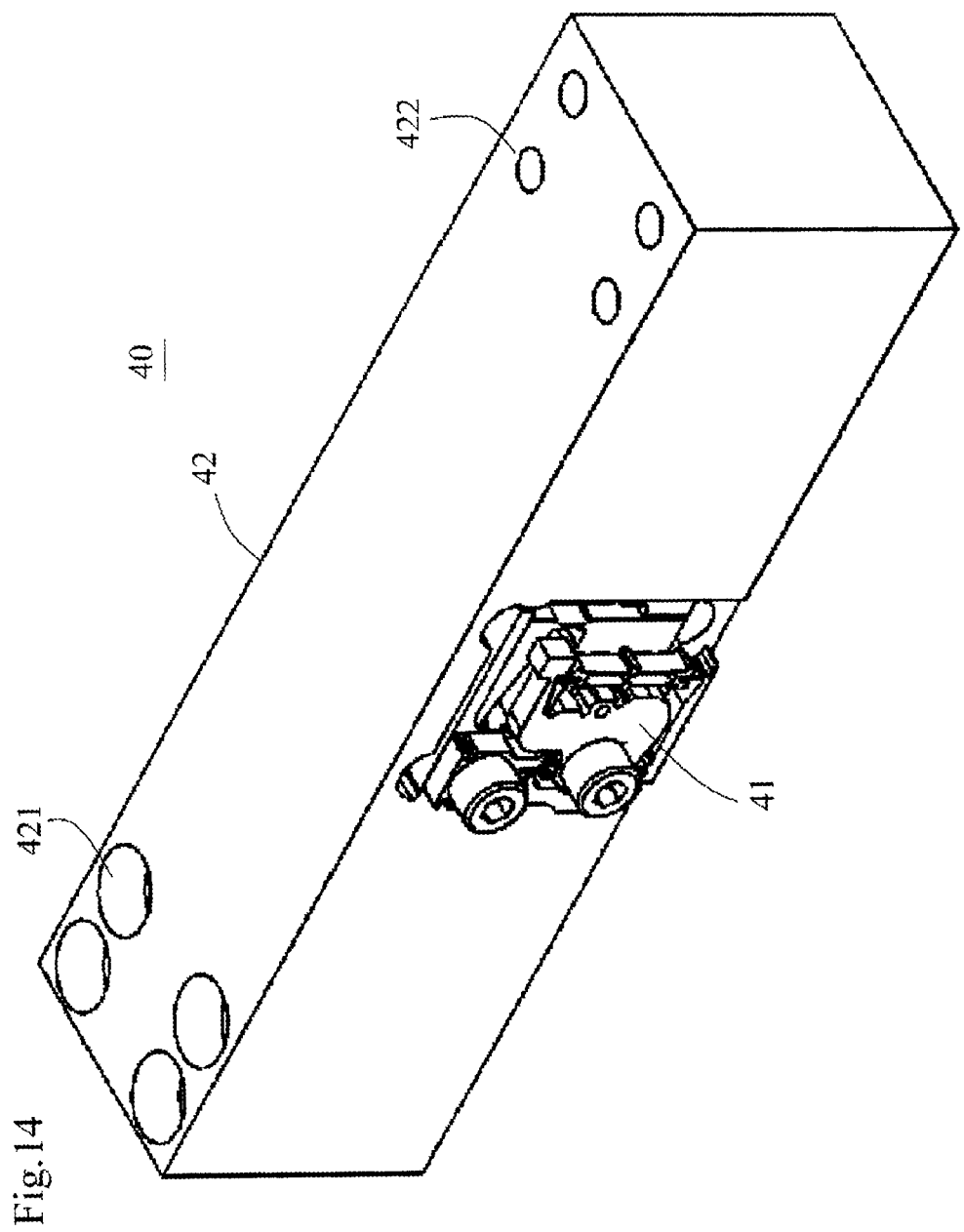
FIG. 14 is a perspective view of the load sensor according to an embodiment of the present invention.

As shown in FIG. 14, a load sensor 40 to be accommodated in the load sensor chamber 331 comprises a tuning fork vibrator 41 and a block body 42 that transmits an applied load to the tuning fork vibrator 41 in a reduced manner. The block body 42 of the load sensor 40 is made of aluminum alloy and is cut out at both sides of the block to form a Roberval mechanism and a lever mechanism within the block.

At a fixed end of the block body 42, there are formed four bolt holes 421 that penetrate the block body 42. Bolts 43 (see FIG. 9) inserted into the bolt holes 421 are screwed into screw holes 336 (see FIG. 8) at the bottom of the load sensor chamber 331 of the sensor case 33, thereby fixedly mounting the load sensor 40 inside the load sensor chamber 331.

Figure 15:
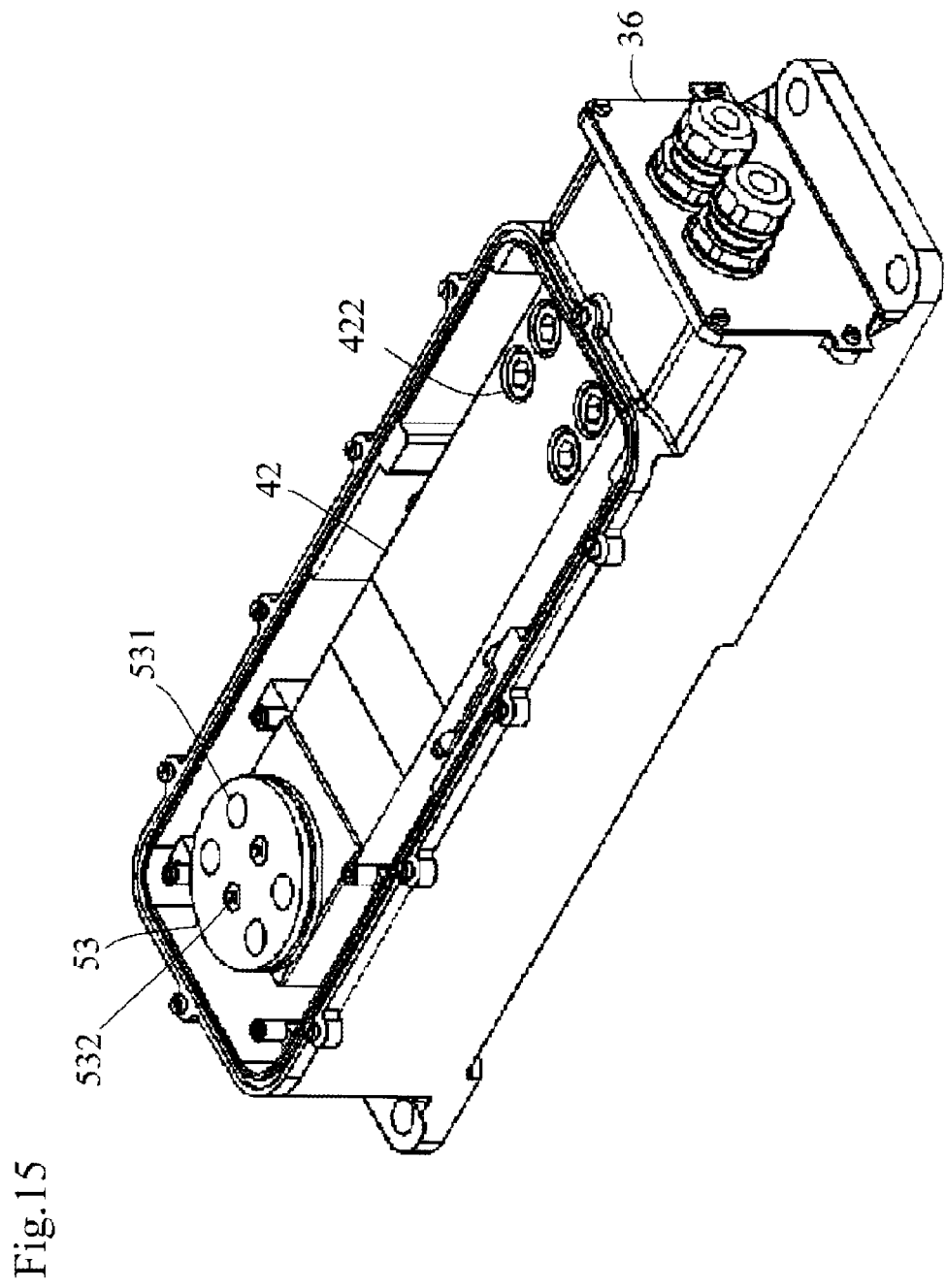
FIG. 15 is an illustration the condition of the embodiment of the present invention in which a load sensor is accommodated in the sensor case.

FIG. 15 illustrates the condition in which the load sensor 40 is accommodated in the load sensor chamber 331.

On the other hand, at a movable end of the block body 42, there are formed screw holes 422 for screw mating with bolts 37 (see FIG. 9). The weight of a load to be weighed is transmitted to the block body 42 by way of the bolts 37.

As shown in FIG. 5, the bolts 37 are fixedly mounted onto a mounting member 312 that is mounted on the lower surface side of the upper support member 31. The mounting member 312 is fixedly mounted on a mounting member 311 that is placed at the upper surface side of the upper support member 31, thereby coupling to the upper support member 31. As a result, the bolts 37 are mechanically coupled to the upper support member 31 for transmitting its movement to the bolts 37. As shown in FIG. 4, head portions of the bolts 37 are seen in elliptic openings 313 in the mounting member 311.

The particular configuration as shown in FIG. 5 enables to replace only the lower side portion in FIG. 5 in case of field maintenance.

Although front ends of the bolts 37 pass through a hole 351 in the cover 35 and are finally screw mated with the screw holes 422 in the block body 42 as shown in FIG. 9, measurement precision may degrade if there is any gap between the hole 351 in the cover 35 and the bolts 37 because air containing moisture and dust tends to enter the load sensor chamber 331 through such gap. Accordingly, a sealing mechanism is employed for covering the gap in the hole 351 with the diaphragm 51.

The sealing mechanism comprises the diaphragm 51, clamping plates 53 for sandwiching the periphery of the diaphragm 51 with two circular disks and a mounting plate 52 for fixedly mounting the outer periphery of the diaphragm 51 on the rear surface of the cover 35. As shown in FIG. 15, the clamping plates 53 are formed with holes 531 for tightly mating with the bolts 37 and screws 532 for coupling the two circular disks.

The clamping plate 53 can be coupled to the diaphragm 51 by unscrewing the screws 532 and then tightly screwing the screws 532 to the condition in which periphery of the diaphragm 51 is clamped by the pair of disks. The outer circumference of the diaphragm 51 is firmly mounted on the rear surface of the cover 35 by the mounting plate 52. Then, bolts 37 are inserted into holes 531 in the clamping plate 53, their front ends are screwed in screw holes 422 in the block body 42 and then the opening of the load sensor chamber 331 is tightly covered with the cover 35 to complete the sealing mechanism.

Since the outer surface of the sensor case 33 is made of anticorrosive stainless material, inside of the sensor case 33 is safely free from moisture and dust after completing the sealing mechanism.

The sealing mechanism as shown in FIG. 9 is advantageous in that sealing performance is unaffected because the diaphragm is left untouched even if it is required to open the cover 35 of the sensor case 33.

In the platform scale as implemented to have the aforementioned particular configuration, any weight applied to the upper frame 10 is transmitted to the upper support member 31 of the pair of load detection units 30 in contact with the upper frame 10. It is then transmitted from the upper support member 31 to the bolts 37 supporting the upper support member 31, thereby transforming the movable end of the block body 42 of the load sensor 40 by the load applied to the bolts 37. A signal in response to such transformation is outputted from the tuning fork vibrator 41. Such signal is then outputted after being converted into a digital signal by the circuit on the circuit board that is accommodated in the circuit board chamber 332. Digital signals outputted from the pair of load detection units 30 are added for displaying on a display unit (not shown) as the measured weight of the abject to be weighed.

It is to be noted that detection precision is degraded if there is any horizontal component force included in the force acting from the upper frames 10 on the upper support members 31 of the load detection units 30. In order to avoid such problem, the platform scale of the present invention is designed to interpose component force damping devices 32 between the upper frame 10 and the upper support members 31 to release horizontal component force as shown in FIG. 1.

As shown in FIGS. 1, 3 and the like, the sensor cases 33 of the load detection units 30 also include mounting members 21, 22 attached to the base frames 20 in order to firmly mounting the sensor cases 33 thereon. Also mounted on the mounting members 21, 22 are adjusters 222 for adjusting the height and horizon of the weighing plate and stopper pins 221 for limiting the movable range of the upper frame 10 in cooperation with stopper members 101 of the upper frame 10.

In the platform scale as described hereinabove, the sensor cases 33 of the load detection units 30 also have a purpose as a structural member for the base frames. It is to be noted that the base frame is formed as a rectangular member in conventional platform scales for placing a load detection member on such base frame, thereby increasing height of the weighing table. However, since the sensor case of the load detection unit 30 is also used as the base frame in the platform scale of the present invention, it is possible to decrease height of the weighing table. Additionally, decreased number of components and manufacturing steps help to reduce production cost.

Moreover, since the mechanical strength of the sensor case 33 and the block body 42 of the load sensor is high, it is possible to stably maintain high precision even in case of weighing very heavy objects.

It is to be noted that the load detection unit 30 as shown in FIG. 4 is also available to users in the condition as shown in FIG. 4 without coupling to the base frames 20 and the upper frame 10. For example, users who acquired a pair of such load detection units 30 can place them in parallel on a horizontal plane and then placing a flat plate thereon in order to implement a particular platform scale best fit to their operation fields.

Figure 16:
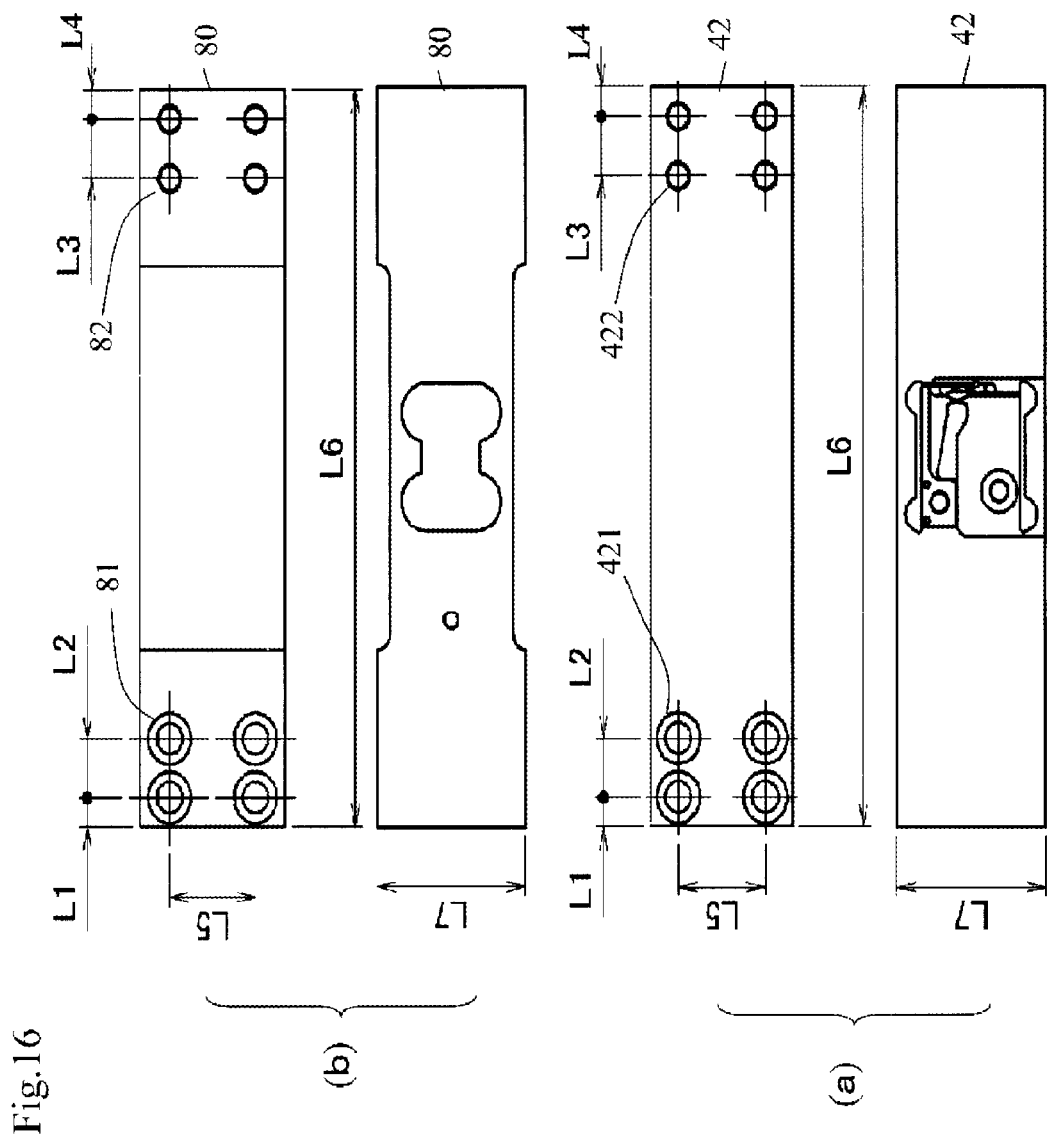
FIG. 16 is an illustration to show how the load sensor is replaced by a load cell in an embodiment according to the present invention.

It is also possible to use the load sensor 40 provided with the tuning fork vibrator 41 as shown in FIG. 14 or the load cell 80 provided with a strain gauge as the load sensor of the load detection unit 30 by equalizing the length (L6) and height (L7) of the block body 42 of the load sensor 40, the location, spacing, and size of the bolt holes 421 and the location, spacing and size of the screw holes 422 as shown in FIG. 16 (a) to the length (L6) and height (L7) of the load cell 80, the location, spacing and size of the bolt holes 81 and the location, spacing and size of the screw holes 82 as shown in FIG. 16 (b).

By making the load sensors to be used with the load detection unit selectable as described hereinabove, it makes it possible for users to switch the sensor depending upon application environment, i.e., choosing the load sensor provided with a tuning fork vibrator when using in no external vibration environment, while choosing the load sensor provided with a strain gauge when using in certain external vibration environment.

Although only two sensor cases are employed between parallel frames in the above embodiments, three or more sensor cases can be employed for maintaining the distance between the base frames. It is also possible to maintain the distance between the base frames using plural rows of sensor cases each consisting a pair of sensor cases coupled to each other in a straight line.

Figure 17:
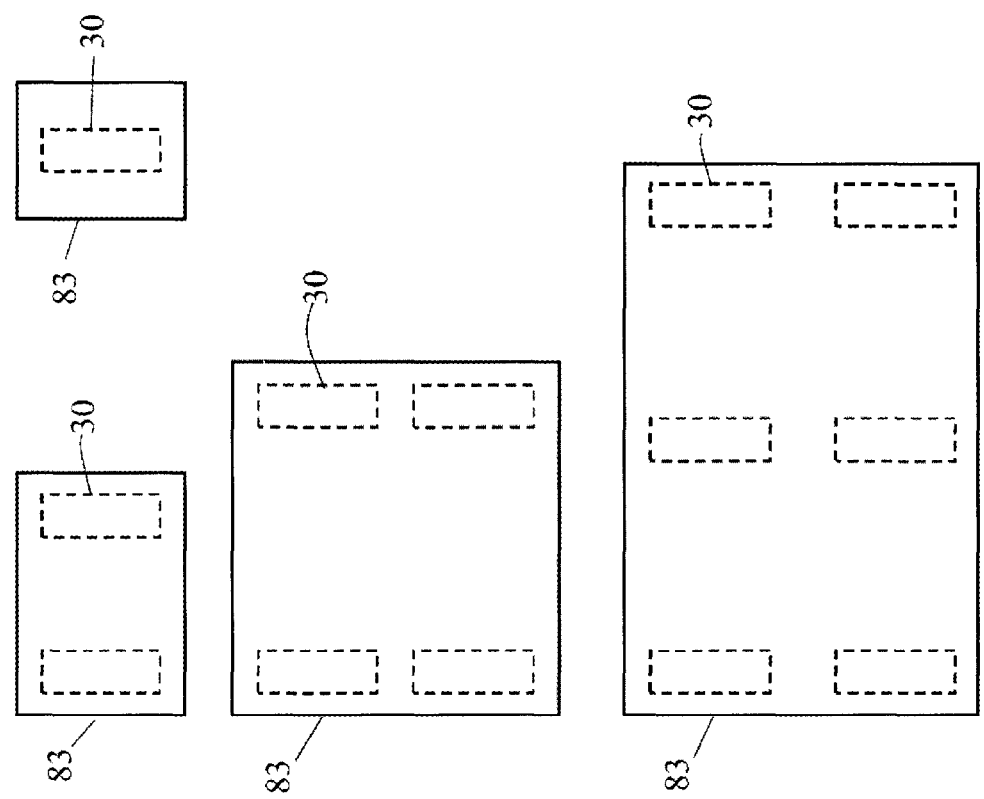
FIG. 17 is an illustration to show the number and arrangement of the load detection units are changed depending on the size of the weighing table (weighing dish) in embodiments of weighing machine according to the present invention.

Additionally, the number and positioning of the load detection units 30 can be changed depending upon the size of weighing table (weighing dish) 83 as shown in FIG. 17.

INDUSTRIAL APPLICABILITY OF THE INVENTION

Because of high weighing precision, the platform scale and the load detection unit according to the present invention find wide applications not only in production fields in manufacturing plants but also in every fields of measuring weight of objects to be weighed such as, for example, in distribution fields, medical fields, education and research fields, agricultural fields, fishing fields and homes.

DESCRIPTION OF REFERENCE NUMERALS 10 upper frame
20 base frame
21 mounting member
22 mounting member
30 load detection unit
31 upper support member
32 component force damping device
33 sensor case
35 cover
37 bolts
41 tuning fork vibrator
42 block body
43 bolts
51 diaphragm
52 mounting plate
53 clamping plate
80 load cell
81 bolt holes
82 screw holes
101 stopper member
221 stopper pins
222 adjuster
311 mounting member
312 mounting member
313 elliptical openings
314 screws
331 load sensor chamber
332 circuit board chamber
333 isolation wall
334 air space
335 air hole
336 screw holes
337 screw holes
339 groove for sealing grommet
340 recessed portion
341 pins
342 screws
343 porous film
344 non-woven sheet
345 metal plate
351 hole
421 bolt holes
422 screw holes
531 holes
532 screws

What is claimed is:

1. A platform scale for weighing an object to be weighed by supporting it with one or a plurality of load detection section characterized in that the load detection section comprises:
   a load sensor including a tuning fork vibrator and a block body coupled to the tuning fork vibrator for transmitting an applied load by reducing the load;
   a circuit board mounting thereon circuitry for converting a signal from the tuning fork vibrator into a digital signal; and
   a sensor case for accommodating the load sensor and the circuit board;
   wherein the sensor case is made of casting stainless material by a lost wax process and is directly coupled to parallel base frames in a manner to maintain the distance between the base frames, wherein said sensor case and said parallel base frames together form a substantially rigid base, with said sensor case having sufficient rigidity to serve as a structural member for maintaining the distance between the base frames;
   wherein the sensor case comprises a load sensor chamber for containing the load sensor, a circuit board chamber for containing the circuit board and an isolation wall for preventing air flow between the load sensor chamber and the circuit board chamber and ventilation of the load sensor chamber is carried out only through an air hole in the bottom of the load sensor chamber.

2. A platform scale of claim 1, wherein the air hole is covered with a filter made of a lamination of a porous film and a non-woven sheet at the outside of the sensor case and the outer surface of the filter is clamped by a plate that is removable when replacing the filter so that external air enters the load sensor chamber passing through the filter at the periphery of the plate and the air hole, while the air inside the load sensor chamber is exhausted in the reverse route.

3. A platform scale of either one of claim 1 or 2, wherein the block body of the load sensor is firmly mounted on the bottom of the load sensor chamber by inserting bolts into through holes provided at a fixed end of the block body and the block body transforms by receiving the load through bolts coupled to a movable end and the load sensor is replaceable with a load cell having the same mounting structure to the load sensor chamber and the coupling structure to the bolts at the fixed end.

4. A load detection unit to be used with a platform scale for weighing an object to be weighed, comprising:
   a load sensor including a tuning fork vibrator and a block body coupled to the tuning fork vibrator for transmitting an applied load by reducing the load;
   a circuit board mounted thereon circuitry for converting a signal from the tuning fork vibrator into a digital signal; and
   a sensor case for accommodating the load sensor and the circuit board,
   wherein the sensor case is made by casting stainless material by a lost wax process and comprises a load sensor chamber containing the load sensor therein, a circuit board chamber containing said circuit board therein, and an isolation wall preventing air flow between the load sensor chamber and the circuit board chamber, wherein said isolation wall has a low heat conductivity as compared to aluminum such as to limit heat conduction to the load sensor chamber from the circuit board chamber, and wherein air in the load sensor chamber is ventilated only through an air hole in the bottom of the load sensor chamber.

5. A load sensor unit of claim 4, wherein the air hole is covered with a filter made of a lamination of a porous film and a non-woven sheet at the outside of the sensor case, the outer surface of the filter is clamped by a plate that is removable when replacing the filter, external air is permitted to enter the load sensor chamber through the filter at the periphery of the plate and the air hole, and the air inside the load sensor chamber is exhausted in the reverse route.

* * * * *